Aug. 31, 1965   A. C. HOLLADAY ETAL   3,203,537
AUTOMATIC CONTROLLER FOR TRACKING OF LEHR CONVEYOR BELTS
Filed July 22, 1963                         2 Sheets-Sheet 1
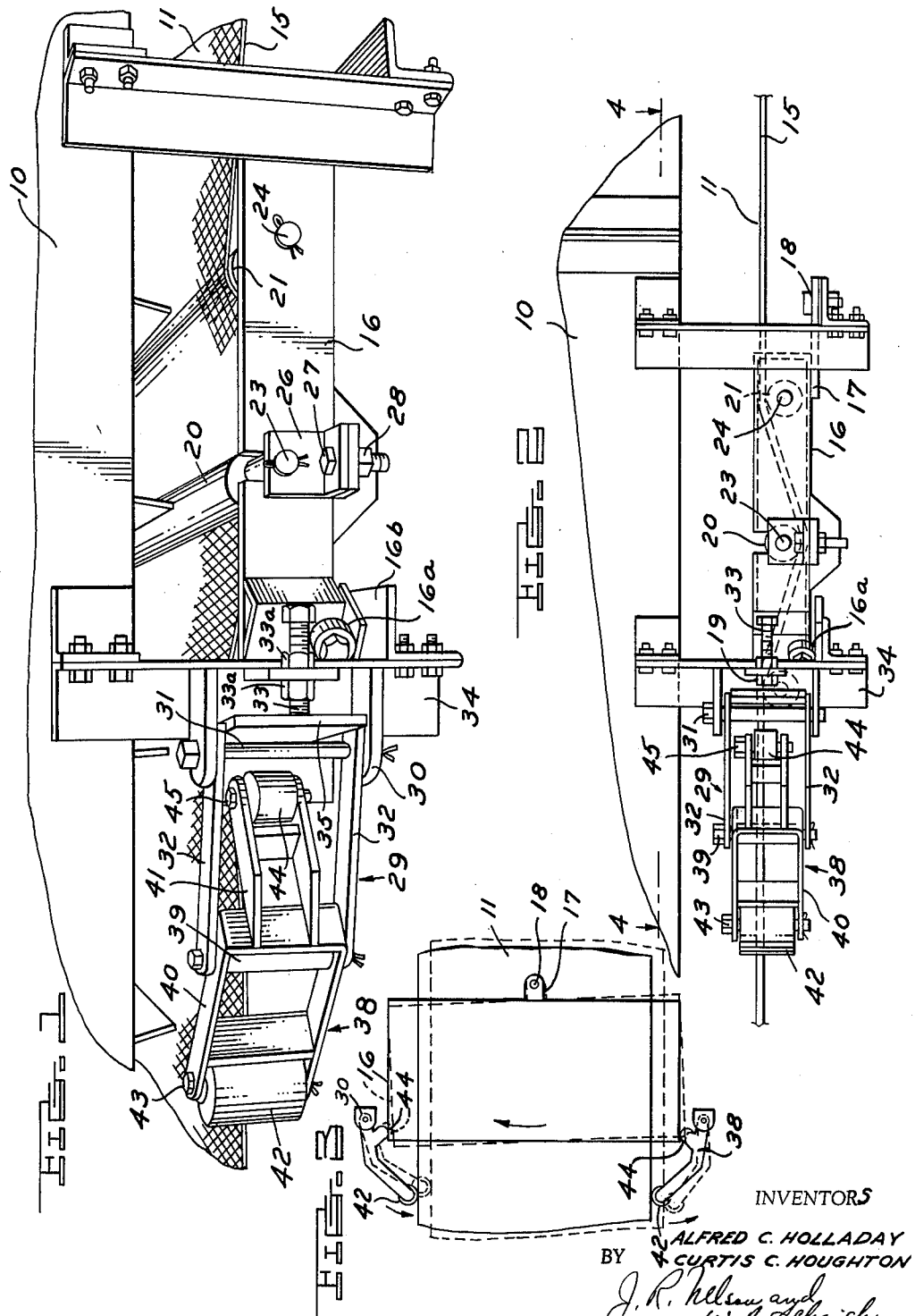
INVENTORS
ALFRED C. HOLLADAY
CURTIS C. HOUGHTON
BY
ATTORNEYS Aug. 31, 1965   A. C. HOLLADAY ETAL   3,203,537
AUTOMATIC CONTROLLER FOR TRACKING OF LEHR CONVEYOR BELTS
Filed July 22, 1963   2 Sheets-Sheet 2
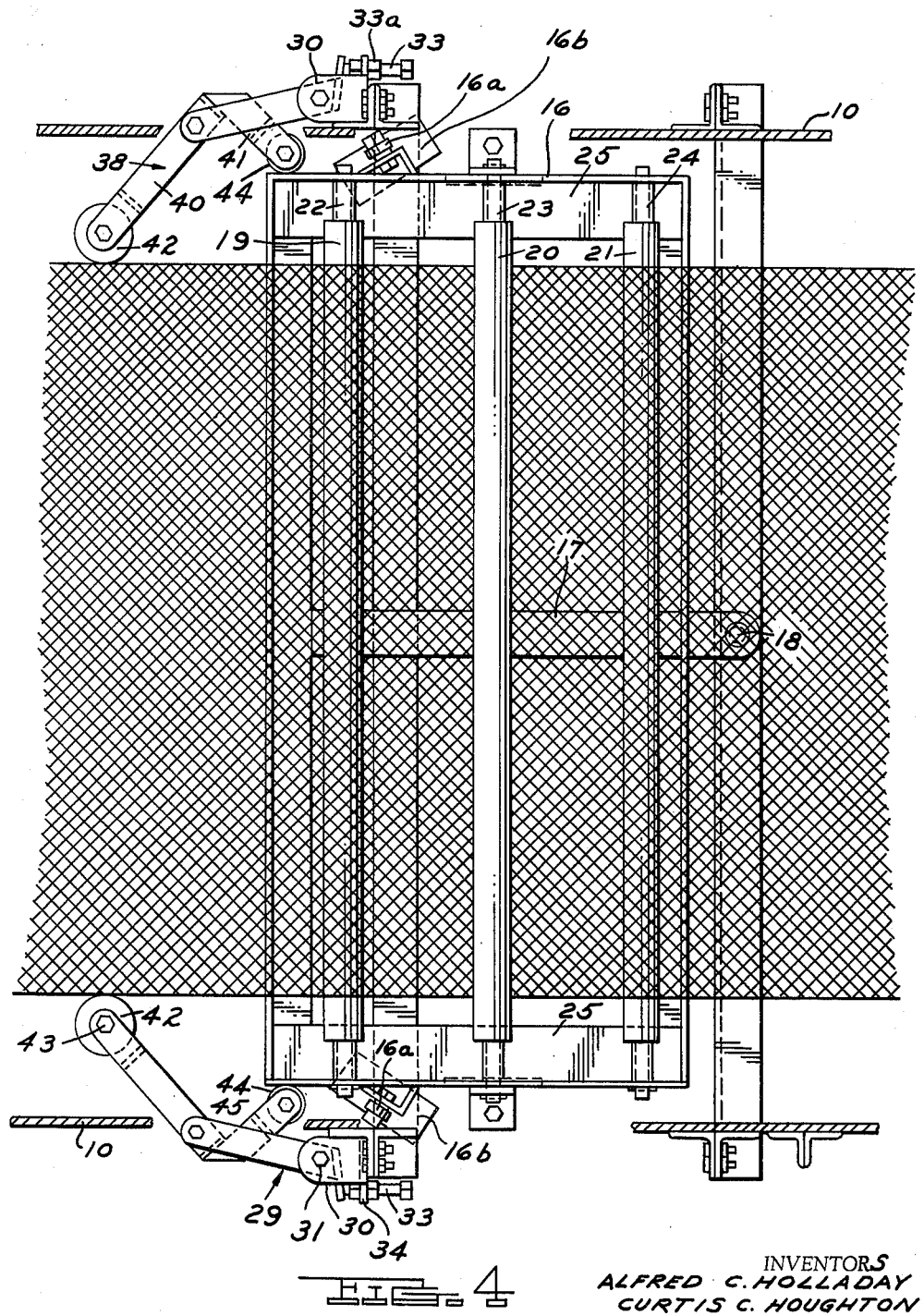
INVENTORS
ALFRED C. HOLLADAY
CURTIS C. HOUGHTON
BY
J. R. Nelson and
W. A. Schaich
ATTORNEYS

United States Patent Office 3,203,537
Patented Aug. 31, 1965

3,203,537
AUTOMATIC CONTROLLER FOR TRACKING OF LEHR CONVEYOR BELTS
Alfred C. Holladay and Curtis C. Houghton, Elmer, N.J., assignors to Owens-Illinois Glass Company, a corporation of Ohio
Filed July 22, 1963, Ser. No. 296,807
14 Claims. (Cl. 198—202)

This invention relates to lehrs for annealing glassware and particularly to lehr conveyor belts.

In the annealing of glassware, it is conventional to utilize an endless lehr belt which is driven such that an upper reach thereof passes through the lehr and a lower reach extends below the lehr. The problem to which the present invention is directed has to do with the matter of alignment of the lehr belt. Although the lehr belt may be aligned with the axis of the lehr, changes in loading, physical changes in lehr structure or maintenance work on the lehr as well as temperature changes in the lehr may throw the lehr belt out of alignment. It has heretofore been customery to utilize a manually operated alignment mechanism, which is a device providing some means for manually moving a portion of the belt laterally of the conveyor when an operator sees that the belt is moving out of its original alignment. Obviously, such an arrangement is not satisfactory since it relies on observation by an operator before the belt has moved out of alignment to any great degree. In the event that the misalignment is not noticed soon enough to make a compensating adjustment, damage to the lehr belt with resultant expense and loss of use of the lehr results.

It is an object of this invention to provide an automatic controller for tracking of a lehr conveyor belt which automatically moves the lehr belt back into alignment in the even that it tends to move out of alignment.

It is a further object of the invention to provide such a controller which is simple and relatively inexpensive.

It is a further object of the invention to provide such a controller which is entirely mechanical.

In the drawings:

FIG. 1 is a fragmentary perspective view of a lehr embodying the invention.

FIG. 2 is a fragmentary side elevational view of the lehr embodying the invention.

FIG. 3 is a partly diagrammatic plan view of a lehr embodying the invention.

FIG. 4 is a fragmentary sectional view on an enlarged scale taken along the line 4—4 in FIG. 2.

Referring to FIGS. 1 and 2, the invention is adapted to be used with a lehr 10 for annealing glassware which is of conventional construction and includes a longitudinally extending temperature control passage through which the upper reach of an endless lehr belt 11 passes. The lower reach of the lehr belt 11 passes beneath the lehr 10 proper and externally of the longitudinal passage in accordance with well-known practice. The lehr belt 11 is of conventional construction and is preferably made of spiral links joined together by lateral wire strands with the edges 15 of the lehr belt welded together. This construction provides a foraminous belt through which air may flow freely about glassware when the glassware is positioned on the belt.

In accordance with the invention, a controller is provided along the lower reach of the lehr belt to sense any misalignment of lehr belt and automatically apply a force laterally to the lehr belt to return to its original position with respect to the lehr.

As shown in FIGS. 1, 2 and 4, the controller comprises an open rectangular frame 16 which has a projecting lever 17 that is pivoted to the underside of the lehr substantially centrally thereof by pin 18. A plurality of rolls 19, 20, 21 are rotatably mounted by means of bearings on rods 22, 23, 24 which, in turn, extend between the angle sides 25 of the frame. Rollers 16a are mounted on the sides 25 of frame 16 and engage fixed horizontal plates 16b and support the rear of frame 16 in its swinging movement about pin 18.

As shown in FIGS. 1 and 2, the lower reach of the endless lehr belt 11 is trained over roll 19, under roll 20, and over roll 21. As shown in FIG. 2, the ends of rod 23 which support central roll 20 are mounted on brackets 26 which are clamped on the sides 25 by a bolt 27 and nut 28 so that the roll 20 is removable and adjustable upwardly and downwardly to change the tension on the lower reach of the lehr belt 11.

The controller further includes an arm 29 pivotally mounted on a bracket 30 on each side of the lehr by a pin 31 extending through the bars 32 of the arm 29. A bolt 33 is threaded through a support bracket 34 on each side of the lehr and engages a stop plate 35 welded between the bars 32 to limit the outward pivotal movement of each arm 29, as presently described. Bolt 33 is locked in position by lock nuts 33a.

A crank 38 is pivoted between the bars 32 of arm 29 by a pin 39 and comprises a first U-shaped leg 40 and a second spaced leg 41. A roller 42 is rotatably mounted between the arms of leg 38 by a pin 43 and a roller 44 is rotatably mounted between the ends of the arm of the second leg 41 on a pin 45.

As shown in FIG. 4, roller 42 is adapted to engage the edge of the lehr belt 11 and roller 44 is adapted to engage the side of the frame 16. The bolts 33 are adjusted so that the rollers 42, 44 are in engagement when the lehr belt 11 is in proper alignment with respect to the lehr.

In the event that the lehr belt tends to become misaligned, the movement of the lehr belt laterally of the conveyor carries with it the frame 16 through the engagement of the rolls 19, 20 and 21 with the lehr belt. This movement applies a force to one of the rollers 44 and, in turn, swings the crank 38 to cause the roller 42 on the corresponding crank to apply a force tending to return the lehr belt to its original aligned position.

The manner of operation of the controller can be readily understood with reference to FIG. 3. As shown in FIG. 3, in the event that the lehr belt moves from the solid line position to the dotted line position, it carries with it the frame 16. This applies a force to the lower crank 38 which then pivots and swings the corresponding roller 44 upwardly to return the lehr belt to its original aligned position.

It can thus be seen that there has been provided a controller for tracking and automatically returning the lehr belt to its original aligned position without any supervision by a human operator. The controller is relatively simple and entirely mechanical in its operation.

We claim:
1. In a lehr, the combination comprising
   an endless driven lehr belt having a reach thereof passing along a portion of said lehr,
   and a lehr belt controller comprising
   a frame, means for supporting said frame for movement laterally of the lehr, a plurality of longitudinally spaced rolls mounted rotatably on said frame with their axes extending laterally of said lehr and said frame, said belt being threaded between said rolls, and mechanical means positioned on each side of said frame engaging said frame and the edge of said belt and responsive to movement of said frame in one direction laterally of said lehr due to lateral movement of said lehr belt to provide a force on the edge of said lehr belt in the opposite lateral direction and thereby return said lehr belt to its original aligned position relative to the lehr, said last-mentioned means comprising a crank pivotally mounted along each side edge of said belt and having one end thereof adapted to engage said lehr belt and the other end thereof adapted to engage said frame.

2. In a lehr, the combination comprising an endless driven lehr belt having a reach thereof passing along a portion of said lehr, and a lehr belt controller comprising a frame, means for supporting said frame for movement laterally of the lehr, a plurality of longitudinally spaced rolls mounted rotatably on said frame with their axes extending laterally of said lehr and said frame, said belt being threaded between said rolls, and mechanical means positioned on each side of said frame engaging said frame and the edge of said belt and responsive to movement of said frame in one direction laterally of said lehr due to lateral movement of said lehr belt to provide a force on the edge of said lehr belt in the opposite lateral direction and thereby return said lehr belt to its original aligned position relative to the lehr, said last-mentioned means comprising an arm pivoted about a vertical axis along each side of said lehr, and a crank pivoted intermediate its ends on each said arm, said crank having one end thereof adapted to engage said frame and the other end thereof adapted to engage the edge of said lehr belt, and means for limiting the outward movement of said arm relative to said lehr.

3. In a lehr, the combination comprising an endless driven lehr belt having a reach thereof passing along a portion of said lehr, and a lehr belt controller comprising a frame, means for supporting said frame for movement laterally of the lehr, a pluraliy of longitudinally spaced rolls mounted rotatably on said frame with their axes extending laterally of said lehr and said frame, said belt being threaded between said rolls, and mechanical means positioned on each side of said frame engaging said frame and the edge of the belt and responsive to movement of said frame in one direction laterally of said lehr due to lateral movement of said lehr belt to provide a force on the edge of said lehr belt in the opposite lateral direction and thereby return said lehr belt to its original aligned position relative to the lehr, and means for adujusting the position of at least one of said rolls.

4. In a lehr, the combination comprising an endless driven lehr belt having a reach thereof passing along a portion of said lehr, and a lehr belt controller comprising a frame, means for supporting said frame for movement laterally of the lehr, a plurality of longitudinally spaced rolls mounted rotatably on said frame with their axes extending laterally of said lehr and said frame, said belt being threaded between said rolls, and mechanical means positioned on each side of said frame engaging said frame and the edge of the belt and responsive to movement of said frame in one direction laterally of said lehr due to lateral movement of said lehr belt to provide a force on the edge of said lehr belt in the opposite lateral direction and thereby return said lehr belt to its original aligned position relative to the lehr, said means for supporting said frame for lateral movement comprising a pivot at the forward end of said frame, and support means along the sides of said frame.

5. In a lehr, the combination comprising an endless driven lehr belt having a reach thereof passing along a portion of said lehr, and a lehr belt controller comprising a frame, means for supporting said frame for movement laterally of the lehr, a plurality of longitudinally spaced rolls mounted rotatably on said frame with their axes extending laterally of said lehr and said frame, said belt being threaded between said rolls, and mechanical means positioned on each side of said frame engaging said frame and the edge of the belt and responsive to movement of said frame in one direction laterally of said lehr due to lateral movement of said lehr belt to provide a force on the edge of said lehr belt in the opposite lateral direction and thereby return said lehr belt to its original aligned position relative to the lehr, said supporting means comprising rollers rotatably mounted on said frame, and substantially horizontal surfaces engaged by said rollers and mounted on said lehr.

6. In a lehr, the combination comprising an endless driven lehr belt having a reach thereof passing along a portion of said lehr, and a lehr belt controller comprising a plurality of longitudinally spaced rolls mounted rotatably with their axes extending laterally of said lehr and said frame, said rolls being movable in unison laterally of said lehr, said belt being threaded between said rolls in such a manner that when said lehr belt moves laterally of said lehr said rolls are moved laterally, and means positioned adjacent each side of the belt and responsive to movement of said rolls in one direction laterally of said lehr due to lateral movement of said lehr belt to provide a force on the edge of said lehr belt in the opposite lateral direction and thereby return said lehr belt to its original aligned position relative to the lehr.

7. In a lehr, the combination comprising an endless driven lehr belt having a reach along a portion of the lehr, and a lehr belt controller comprising a frame, means for supporting said frame for movement laterally of the lehr, a plurality of longitudinally spaced rolls mounted rotatably on said frame with their axes extending laterally of said lehr and said frame, said belt being threaded between said rolls in such a manner that when said lehr belt moves laterally of said lehr said frame is moved laterally, and means adjacent each side of said frame engaging the frame and the edge of the belt and responsive to movement of said frame in one direction laterally of said conveyor due to lateral movement of said lehr belt to provide a force on the adjacent edge of said lehr belt in the opposite lateral direction and thereby return said lehr belt to its original aligned position relative to the lehr.

8. For use with an endless belt, a belt controller comprising
a frame,
means for supporting said frame for movement laterally of the belt,
a plurality of longitudinally spaced rolls mounted rotatably on said frame with their axes extending laterally of said frame,
said frame being adapted to have a belt threaded between said rolls in such a manner that when the belt moves laterally said frame is moved laterally,
and mechanical means positioned on each side of said frame engaging said frame and adapted to engage the edge of a belt threaded between said rolls and responsive to movement of said frame in one direction laterally due to lateral movement of the belt and adapted to provide a force on the edge of the belt in the opposite lateral direction and thereby return the belt to its original aligned position,
said last-mentioned means comprising
a crank pivotally mounted along each side of the frame and having one end thereof adapted to engage the belt and the other end thereof adapted to engage said frame.

9. For use with an endless belt, a belt controller comprising
a frame,
means for supporting said frame for movement laterally of the belt,
a plurality of longitudinally spaced rolls mounted rotatably on said frame with their axes extending laterally of said frame,
said frame being adapted to have a belt threaded between said rolls in such a manner that when the belt moves laterally said frame is moved laterally,
and mechanical means positioned on each side of said frame engaging said frame and adapted to engage the edge of a belt threaded between said rolls and responsive to movement of said frame in one direction laterally due to lateral movement of the belt and adapted to provide a force on the edge of the belt in the opposite lateral direction and thereby return the belt to its original aligned position,
said last-mentioned means comprising
an arm pivoted about a vertical axis along each side of the frame,
and a crank pivoted intermediate its ends on each said arm,
said crank having one end thereof adapted to engage said frame and the other end thereof adapted to engage the edge of the belt,
and means for limiting the outward movement of said arm.

10. For use with an endless belt, a belt controller comprising
a frame,
means for supporting said frame for movement laterally of the belt,
a plurality of longitudinally spaced rolls mounted rotatably on said frame with their axes extending laterally of said frame,
said frame being adapted to having a belt threaded between said rolls in such a manner that when the belt moves laterally said frame is moved laterally,
and mechanical means positioned on each side of said frame engaging said frame and adapted to engage the edge of a belt threaded between said rolls and responsive to movement of said frame in one direction laterally due to lateral movement of the belt and adapted to provide a force on the edge of the belt in the opposite lateral direction and thereby return the belt to its original aligned position,
and means for adjusting the position of at least one of said rolls to adjust the tension on the belt.

11. For use with an endless belt, a belt controller comprising
a frame,
means for supporting said frame for movement laterally of the belt,
a plurality of longitudinally spaced rolls mounted rotatably on said frame with their axes extending laterally of said frame,
said frame being adapted to having a belt threaded between said rolls in such a manner that when the belt moves laterally said frame is moved laterally,
and mechanical means positioned on each side of said frame engaging said frame and adapted to engage the edge of a belt threaded between said rolls and responsive to movement of said frame in one direction laterally due to lateral movement of the belt and adapted to provide a force on the edge of the belt in the opposite lateral direction and thereby return the belt to its original aligned position,
said means for supporting said frame for lateral movement comprising
a pivot at the forward end of said frame,
and support means along the sides of said frame.

12. For use with an endless belt, a belt controller comprising
a frame,
means for supporting said frame for movement laterally of the belt,
a plurality of longitudinally spaced rolls mounted rotatably on said frame with their axes extending laterally of said frame,
said frame being adapted to having a belt threaded between said rolls in such a manner that when the belt moves laterally said frame is moved laterally,
and mechanical means positioned on each side of said frame engaging said frame and adapted to engage the edge of a belt threaded between said rolls and responsive to movement of said frame in one direction laterally due to lateral movement of the belt and adapted to provide a force on the edge of the belt in the opposite lateral direction and thereby return the belt to its original aligned position,
said supporting means comprising
rollers rotatably mounted on said frame and substantially horizontal stationary surfaces engaged by said rollers.

13. For use with an endless belt, a belt controller comprising
a plurality of longitudinally spaced rolls mounted rotatably with their axes extending laterally,
said rolls being movable in unison laterally,
said rolls adapted to have a belt threaded therethrough in such a manner that when the belt moves laterally said rolls are moved laterally,
and means responsive to the movement of said rolls in one direction laterally due to lateral movement of the belt to provide a force on the edge of the belt in the opposite lateral direction and thereby return the belt to its original aligned position.

14. For use with an endless belt, a belt controller comprising,
a frame,
means for supporting said frame for movement laterally,
a plurality of longitudinally spaced rolls mounted rotatably on said frame with their axes extending laterally of said frame,
said rolls adapted to have a belt threaded therebetween in such a manner that when the belt moves laterally said frame is moved laterally, and means adjacent each side of said frame engaging said frame and adapted to engage the edge of a belt threaded between said rolls and responsive to movement of said frame in one direction laterally due to lateral movement of the belt to provide a force on the adjacent edge of the belt in the opposite lateral direction and thereby return the belt to its original aligned position.

References Cited by the Examiner

UNITED STATES PATENTS 2,569,419  9/51  Kendall  198—202

FOREIGN PATENTS 1,117,734  3/56  France.
773,848  5/57  Great Britain.

SAMUEL F. COLEMAN, *Primary Examiner.*